Oct. 28, 1930.  R. A. PURCELL  1,779,889
HAND SHEAR
Filed Aug. 4, 1927
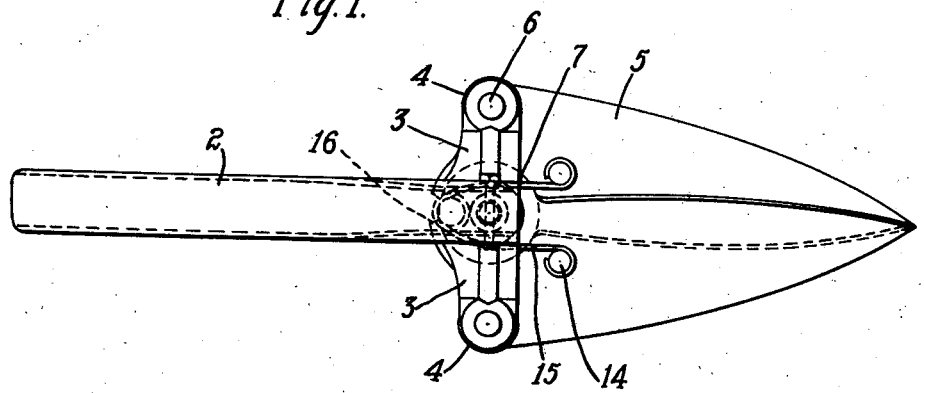
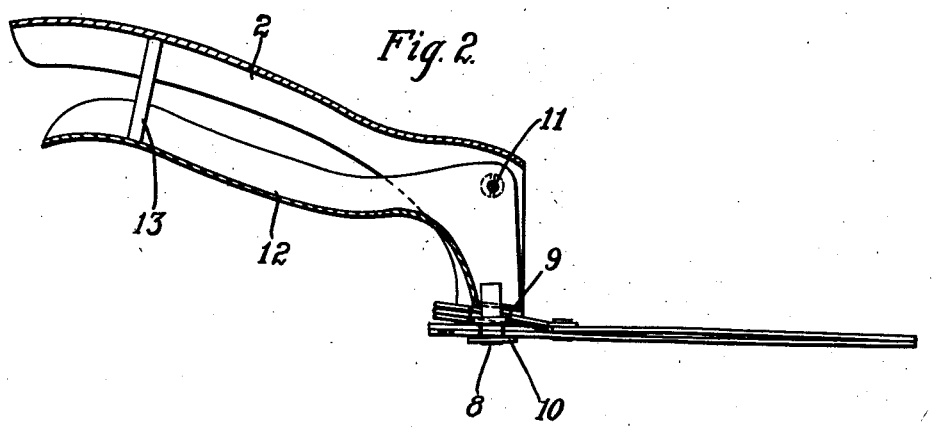
INVENTOR.
Robert A. Purcell
BY
ATTORNEYS.

Patented Oct. 28, 1930

1,779,889

UNITED STATES PATENT OFFICE

ROBERT A. PURCELL, OF ALLIANCE, OHIO, ASSIGNOR TO THE ALLIANCE TOY & SPECIALTY COMPANY, OF ALLIANCE, OHIO, A CORPORATION OF OHIO

HAND SHEAR.

Application filed August 4, 1927. Serial No. 210,494.

This invention relates to hand shears, and is particularly useful in a shear having blades operating in a plane substantially perpendicular to the plane of the handle. Such a shear is shown in the patent to William Dooley, 1,618,817, dated February 22nd, 1927.

A shear of this type requires a pin forming an upstanding pin connected to the shear blade or blades, and serving to transmit the pressure supplied by the operating handle. Some hand shears are open to the objection that the edges of the two shearing blades tend to spring apart, especially if any particularly tough article is placed between them. This springing action either prevents the shear from cutting at all, or else results in a ragged cut. In some cases it may even tend to bend the shear blades. I overcome this difficulty by mounting the pin loosely in the blades. The pin is preferably collared so as to engage a blade face and it is found in operation that the pin is effective for holding the two blades close together at all times, thus materially improving the shearing action and preventing ragged cutting.

I further provide spring means connected directly to the blades. The usual practice is to provide a return spring so as to open the blades, and to make this return spring effective through a shear handle. By attaching the spring to the blades, a more positive opening action is obtained.

In the accompanying drawings which illustrate the present preferred embodiment of my invention as applied to a shear of the Dooley type, Figure 1 is a top plan view of a shear showing the blades in closed position, and Figure 2 is a side elevation partly broken away, also showing the blades in closed position.

The illustrated shear comprises a supporting handle 2 having downwardly extending legs 3 terminating in feet 4. A blade 5 is pivoted to each of the feet 4 by a rivet 6. The blades are each provided with portions 7 to accommodate a pin 8 which pivotally connects the blades together. The pin 8 is provided with a collar 9 which bears against the upper surface of the top blade, and a collar 10 which bears against the lower surface of the bottom blade. As shown in Figure 2, the pin 8 makes a loose fit in the openings provided in the blades.

The supporting handle 2 carries a pin 11 on which is pivoted an operating handle 12. The operating handle 12 carries a post 13 which limits the movement in one direction.

Each blade 5 is provided with a short rivet 14, and a spring 15 is connected to these rivets. While the drawings show the blades in closed position, the spring is effective for normally spreading the blades apart, except when the handle is gripped. Figure 2 shows the action of the loose pin 8 when the shear is actuated. The collar 10 bears against the bottom surface of the lower blade, and the collar 9 bears against the upper surface of the top blade. The rearward portions of the blades are in close contact and the collars 9 and 10 provide a clamping action which causes the working edges of the blades to closely bear against one another through the entire shearing operation. The mechanism is self-adjusting because if any of the parts wear, or if the edges become thinner, the pin 8 simply tilts a little more and thus keeps the edges in the desired relationship.

During the shearing operation the rivets 6 are sprung apart slightly and the legs 3 are sufficiently yieldable to permit of this action. When the handle is released, the spring of the legs 3, coupled with the action of the spring 15, causes the blades to open. The blades 5 are provided with heels 16 which limit the opening movement. It is the portions of the blades adjacent these heels 16 which form the fulcrum about which the pressure of the pin 8 is exerted so as to keep the shearing edges in close engagement.

By reason of the direct application of spring power to the blades, the tendency of the blades to stick is substantially eliminated.

While I have illustrated and described the preferred form of my invention, it will be understood that it is not thus limited, as the invention may be otherwise embodied within the scope of the following claims.

I claim:—

1. A shear comprising a supporting handle having a pair of legs, shear blades pivoted on the legs and pivoted together, the legs being arranged to spring toward or away from one another during operation of the shear, and spring means directly connected to the blades, the spring means and the legs being effective for urging the blades to a desired position.

2. A shear comprising a pair of pivoted blades, each having an opening spaced from its pivot, a pin extending through and lying loosely in the openings, and an operating handle having an opening, the pin extending therethrough, the connection thus formed being effective for transmitting shearing power from the handle to the pin and thence to the blade, the pin being tiltable upon operation of the handle to draw said blades toward a common shearing plane.

3. A shear comprising a pair of overlapping pivoted blades, each having an opening spaced from its pivot and in the overlapping portion of the blade, a pin extending through and lying loosely in the openings, the pin having a collar above the overlapping blade portions and a collar therebelow, and an operating handle having an opening, the pin extending therethrough, the connection thus formed being effective for transmitting shearing power from the handle to the pin and thence to the blade, whereby the pin is tilted upon operation of the handle and the collars are pressed against the blades.

4. In a shear, a pair of blades pivoted to a supporting handle, a pivot pin passing loosely through holes in said blades, collars on said pin for urging the blades together when the pin is tilted, and an operating handle engaging said pin.

5. A shear, comprising a pair of blades loosely pivoted on a tiltable pin, collars on said pin for maintaining the blades in cutting relation, and means engaging the pin for actuating the blades.

6. In a shear, an actuating pin fitting loosely in cooperating blades, collars on said pin, the blades lying between said collars, pivotal supports for the blades and means for moving the pin.

In testimony whereof I have hereunto set my hand.

ROBERT A. PURCELL.